US008479170B2

(12) United States Patent
Prasad et al.

(10) Patent No.: US 8,479,170 B2
(45) Date of Patent: Jul. 2, 2013

(54) GENERATING SOFTWARE APPLICATION USER-INPUT DATA THROUGH ANALYSIS OF CLIENT-TIER SOURCE CODE

(75) Inventors: Mukul R. Prasad, San Jose, CA (US); Sreeranga P. Rajan, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 509 days.

(21) Appl. No.: 12/778,745

(22) Filed: May 12, 2010

(65) Prior Publication Data

US 2011/0283147 A1 Nov. 17, 2011

(51) Int. Cl.
G06F 9/45 (2006.01)
(52) U.S. Cl.
USPC ........... 717/131; 717/129; 717/132; 717/141; 709/203
(58) Field of Classification Search
None
See application file for complete search history.

(56) References Cited

U.S. PATENT DOCUMENTS

| 7,089,542 | B2 * | 8/2006 | Brand et al. | 717/143 |
|---|---|---|---|---|
| 8,209,646 | B2 * | 6/2012 | Chess et al. | 716/106 |
| 2004/0059809 | A1 * | 3/2004 | Benedikt et al. | 709/224 |
| 2004/0117772 | A1 * | 6/2004 | Brand et al. | 717/132 |
| 2005/0022115 | A1 * | 1/2005 | Baumgartner et al. | 715/513 |
| 2009/0106296 | A1 * | 4/2009 | Sickmiller et al. | 707/102 |
| 2009/0265692 | A1 * | 10/2009 | Godefroid et al. | 717/128 |
| 2009/0313319 | A1 * | 12/2009 | Beisiegel et al. | 709/203 |
| 2009/0320045 | A1 * | 12/2009 | Griffith et al. | 719/315 |

OTHER PUBLICATIONS

Barrett, Clark et al., "CVC3," *Proceedings of the 19th International Conference on Computer Aided Verification (CAV '07)*, vol. 4590 of *Lecture Notes in Computer Science*, Jul. 2007.
De Moura, Leonardo et al., "Z3: An Efficient SMT Solver," *Proceedings of Conference on Tools and Algorithms for the Construction and Analysis of Systems (TACAS)*, 2008.
Dutertre, Bruno et al., The YICES SMT Solver, Technical Report, Stanford Research Institute International, 2006. http://yices.csl.sri.com/tool-paper.pdf, 2006.
Guha, Arjun et al., "Using Static Analysis for Ajax Intrusion Detection," *Proceedings of the 18th International World Wide Web Conference (WWW 2009)*, 2009.
Jensen, Simon Holm et al, "Type Analysis for Javascript," *Proceedings of the 16th International Symposium, SAS 2009*, Lecture Notes in Computer Science, Aug. 2009.
Maffeis, Sergio et al., "Language-Based Isolation of Untrusted JavaScript," *Proceedings of the 22nd IEEE Computer Security Foundations Symposium (CSF 2009)*, Jul. 2009.

(Continued)

*Primary Examiner* — Isaac Tecklu
(74) *Attorney, Agent, or Firm* — Baker Botts L.L.P.

(57) ABSTRACT

In one embodiment, analyze client-tier source code of a client-server software application to extract one or more software modules that handle user-input data of the software application. For each one of the software modules, extract from the software module one or more user-input constraints placed on the user-input data, comprising: analyze source code of the software module to determine one or more failure points in the source code; perform symbolic execution on the software module to extract one or more first expressions that cause the software module to reach the failure points, respectively; obtain a second expression as the disjunction of all the first expressions; obtain a third expression as the negation of the second expression; and extract the user-input constraints from the third expression. Determine one or more user-input data that satisfy all the user-input constraints.

15 Claims, 3 Drawing Sheets

OTHER PUBLICATIONS

Mesbah, Ali et al., "Crawling Ajax by Inferring User Interface State Changes," *Proceedings of the 8th International Conference on Web Engineering (ICWE '08)*, 2008.

SeleniumHQ: Web application testing system, http://seleniumhq.org/; downloaded Dec. 3, 2010, Updated Nov. 29, 2010.

Visser, W. et al., "Model Checking Programs," *Automated Software Engineering Journal*, 10(2), Apr. 2003.

U.S. Appl. No. 12/837,818, filed Jul. 16, 2010.
U.S. Appl. No. 12/571,374, filed Sep. 30, 2009.
U.S. Appl. No. 12/730,905, filed Mar. 24, 2010.
U.S. Appl. No. 12/723,568, filed Mar. 12, 2010.
U.S. Appl. No. 12/832,131, filed Jul. 8, 2010.

\* cited by examiner

GENERATING SOFTWARE APPLICATION USER-INPUT DATA THROUGH ANALYSIS OF CLIENT-TIER SOURCE CODE

TECHNICAL FIELD

The present disclosure relates to client-server user-interactive applications.

BACKGROUND

There are multiple types of software applications, one of which is user-interactive software applications. A user-interactive software application may be either a desktop-based application that may be executed on a standalone computing system or a network-based application that may include a server tier and a client tier, with the server tier being executed on a server and the client tier being executed on a client within a client-server environment. With a network-based user-interactive software application, the server tier and the client tier of the application may communicate and exchange application data with each other through a network connecting the server and the client. Typically, a user of a network-based user-interactive software application may interact with the application through the client tier of the application, which is usually executed on a client device used by the user. For example, the user may provide specific input values to the application through a user interface provided by the client tier of the application and displayed on the client device on which the client tier executes.

DETAILED DESCRIPTION

Figure 1:
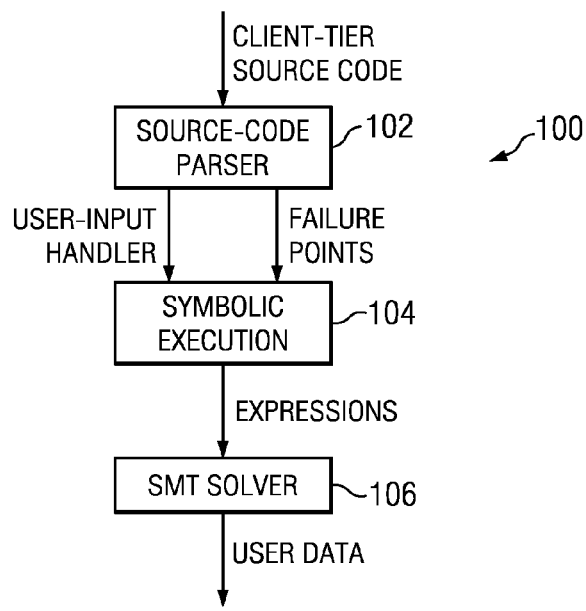
FIG. 1 illustrates an example system for analyzing the client-tier source code of a software application.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In particular embodiments, the client-tier source code of a network-based user-interactive software application is analyzed to extract specific client-tier software modules that handle user input to the application. For each of such software modules, its source code is analyzed to determine the constraints placed on the individual user input by the software module. One or more user-input data that satisfy these constraints are determined. Thereafter, these user-input data may be used in connection with testing the client tier of the software application.

A network-based software application typically includes a server tier and a client tier, with the server tier being executed on a server and the client tier being executed on a client in a client-server environment. Therefore, a network-based software application may also be referred to as a client-server software application. The server tier and the client tier of the application may communicate with each other and exchange application data and user-input data through a computer network connecting the server and the client on which the server tier and the client tier are executed.

A user-interactive software application typically provides a user interface through which a user of the application may provide input data to the application. Since the input data are provided by the user of the application, the input data may also be referred to as user-input data or user data. The user interface may include any number of displayable views, and each view may include any number of user-interface components, such as, for example and without limitation, buttons, checkboxes, pull-down menus, text input fields, or clickable links. The user may choose any suitable user-interface components to provide input to the application. In particular embodiments, a user-interface component through which a user may provide an input value to the application may also be referred to as a user-input component.

In particular embodiments, with a client-server user-interactive software application, the user interface of the application may be provided by the client tier of the application. The client tier may include source code, organized into individual software modules (e.g., functions, procedures, or subroutines), that handles the individual user-interface components, including, for example and without limitation, displaying the user-interface components and processing the user input provided through the user-interface components. A web application is a typical example of such a client-server user-interactive software application. In particular embodiments, the client tier of a web application may include client-tier modules, often implemented using various types of client-side scripting or programming languages, such as, for example and without limitation, HyperText Markup Language (HTML), Dynamic HTML (DHTML), or JavaScript, that may be executed in a web browser on a client device. A user may provide input to the web application through specific user-interface components included in the web pages. For example, a web application may provide a "login" page through which a user may log into his online account associated with the web application. The login page may include a text-input field for a "username", a text-input field for a "password", and a "submit" or "sign in" button. The user may type his username in the "username" text-input field, his password in the "password" text-input field, and then click on the "submit" button to initiate the sign-in process.

In particular embodiments, a user-interactive software application may place various constraints on certain types of user input. Such constraints may be specified in or derived from design specification of the application, and validation code may be included in the client-tier source code and/or the server-tier source code of the application to determine whether specific input values provided by the users satisfy these constraints. For example, suppose a web application includes a web page that provides an input field through which a user may provide his phone number. A constraint may be placed on this specific input field that any input value provided through this input field must consist of numeric digits only. As another example, suppose the web page also provides a second input field through which a user may provide his VISA credit card number. Three constraints may be placed on any input value provided through this second input filed: (1) the input value must consist of numeric digits only; (2) the input value must have 16 numeric digits; and (3) the input value must start with the digit "4".

Figure 2:
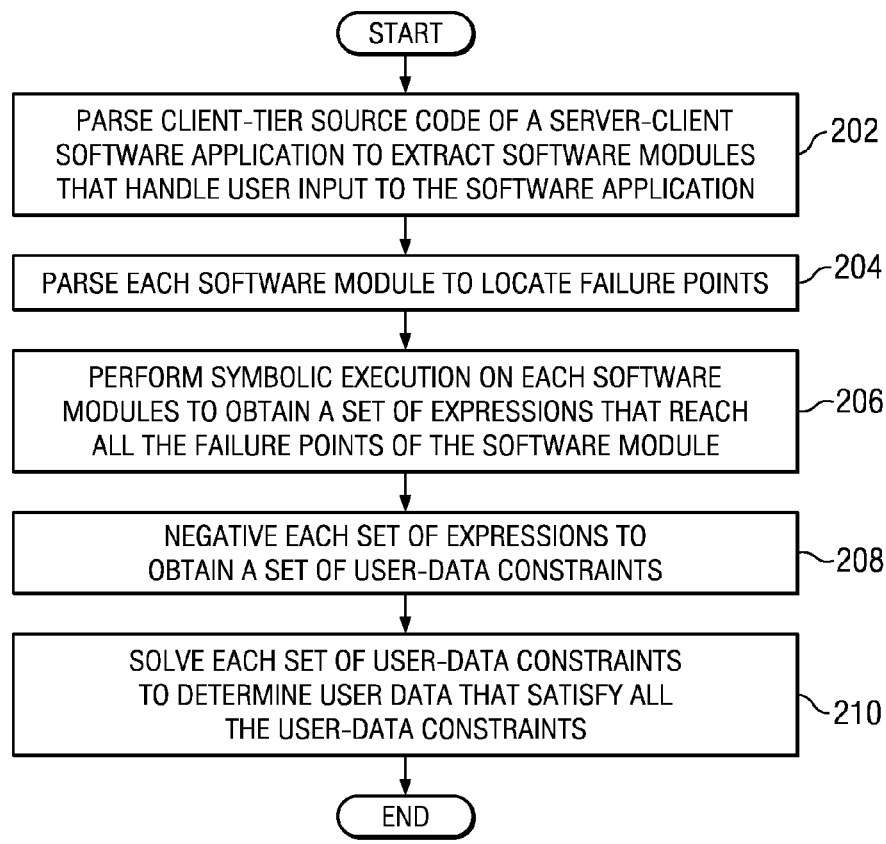
FIG. 2 illustrates an example method for analyzing the client-tier source code of a software application.

In particular embodiments, the client-tier source code of a client-server user-interactive software application may be analyzed to determine the constraints placed on the individual user input to the application, and input values that satisfy these constraints may be determined. FIG. 1 illustrates an example system 100 for analyzing the client-tier source code of a client-server user-interactive software application. FIG. 2 illustrates an example method for analyzing the client-tier source code of a client-server user-interactive software application. FIGS. 1 and 2 are described in connection with each other.

In particular embodiments, the components of system 100 illustrated in FIG. 1 may be implemented as computer hardware or software or a combination thereof. Furthermore, some of these functionalities may be combined into the same components and some may be further divided into sub-components.

Although different programming or scripting languages may have different syntaxes, typically, a user-interface component, especially one through which a user may provide an input value to a software application, may be associated with a handler, also referred to as an event handler or a callback function. In particular embodiments, a handler associated with a user-interface component is a software module (e.g., a function, a procedure, or a subroutine) that is executed (e.g., invoked) whenever a user provides an input value through the user-interface component. Typically, although not required, the source code that is responsible for responding to and processing the input values provided through a user-interface component is included in the handler associated with the user-interface component.

Particular embodiments may parse the client-tier source code of a client-server user-interactive software application to extract client-tier software modules that handle user input to the software application (e.g., the handlers associated with the user-interface components), as illustrated in step 202 of FIG. 2. In particular embodiments, step 202 may be performed by component 102 of system 100 illustrated in FIG. 1, which may take as input the client-tier source code of a software application, parse the client-tier source code, and extract the client-tier software modules that handle the user input to the software application (e.g., the user-input handlers). The analysis of the client-tier code may be static, dynamic, or a combination thereof.

In particular embodiments, a software module that handles a specific user input is associated with a user-interface component through which the actual input values may be provided by the users. For example, the software module may be the event handler or callback function associated with the user-interface component. However, different programming or scripting languages may specify different syntaxes for implementing user-interface components and their associated handlers. Thus, in particular embodiments, the parsing of the client-tier source code may take into consideration the syntaxes of the programming or scripting languages that are used to implement the client-tier source code.

For example, with a web application, a text-input field included in a web page may be implemented as a "<form>" element using HTML; and a handler associated with the "<form>" element may be implemented as an "onsubmit ( )" function using JavaScript. In this case, component 102 may parse the client-tier source code of the web application to search for all the "<form>" elements included in the HTML code and then to locate the "onsubmit ( )" functions associated with the "<form>" elements included in the JavaScript code. The "onsubmit ( )" functions are the client-tier software modules that handle the user input to the web application.

Once the client-tier software modules that handle the user inputs are located, particular embodiments may perform steps 204, 206, 208, 210 illustrated in FIG. 2 with respect to each of the software modules. Using a single software module to illustrate, first, particular embodiments may parse the source code of the software module to locate all the failure points in the source code, as illustrated in step 204 of FIG. 2. In particular embodiments, step 204 may also be performed by component 102 of system 100 illustrated in FIG. 1, which further parses the source code of each of the software module that handle the user input to locate all the failure points included in the source code of the software module.

In particular embodiments, a failure point of a software module may be a point (e.g., a statement) in the source code of the software module where the software module fails to completely execute its function successfully due to some type of error. Considering the following source code of an example software module (e.g., a function) implemented using JavaScript:

```
1    function validateForm(formObj){
2        if(formObj.password.value.length==0){
3            alert("Please enter password!");
4            formObj.password.focus( );
5            return false;
6        }
7        if(!checkEmail(formObj.email.value)){
8            formObj.email.focus( );
9            return false;
10       }
11       if(isNaN(formObj.phno.value)){
12           alert("Please enter correct Phone No!");
13           formObj.phno.focus( );
14           return false;
15       }
16       formObj.actionUpdateData.value="update";
17       return true;
18   }
```

Example function "validateForm" performs three different checks on its input variable, and more specifically, on the current value of its input variable "formObj" in the form of the three "if" statements at lines 2, 7, and 11. If the current value of input variable "formObj" passes a particular check, the function continues its execution. Otherwise, the function stops its execution and returns "false" (e.g., at lines 5, 9, and 14). Only if the current value of input variable "formObj" passes all three checks does the function completes its execution and returns "true" at line 17. In this case, the function "validateForm" has three failure points in its source code, at lines 5, 9, and 14 where the function returns "false" due to the current value of input variable "formObj" failing to pass a particular check.

In particular embodiments, with software modules implemented using JavaScript, component 102 of system 100 may parse the source code of each software module to locate all the "return false" statements in the source code as the failure points of the software module. However, since different programming or scripting languages have different syntaxes, with software modules implemented using other languages, component 102 of system 100 may need to locate different types of statements as the failure points of the software modules based on, for example, the specific syntaxes or programming conventions of the languages used to implemented the software modules. For example, sometimes, it may be conventional for a software module to return "−1" as an indication of error or failure to completely execute the software module successfully. In this case, component 102 of system 100 may parse the source code of such a software module to locate all the "return −1" statements in the source code as the failure points of the software module.

In particular embodiments, only the failure points of each software module that directly handles a user input (e.g., the even handler or callback function that is associated with the user-interface component through which the input values may be provided by the users) are located. If the handler invokes (e.g., calls) another software module, analysis of the source code of this other software module may not provide any additional failure points. For example, function "validateForm" calls another function named "checkEmail" at line 7. The source code of example function "checkEmail" is given below. Note that line 6 of the code of "checkEmail", which appears to be a failure point, does not need to be included in the list of failure points since its effect is captured by the failure point on line 9 in function "validateForm".

```
1    function checkEmail(email){
2        if (/^\w+([\.-]?\w+)*@\w+([\.]?\w+)*
         (\.\w{2,3})+$/.test(email)){{
3            return true;
4        }
5        alert("Invalid E-mail Address! Please re-
         enter.")
6            return false;
7    }
```

Once all the failure points of the software module are located, particular embodiments may perform symbolic execution on the software module to obtain a set of expressions that reach all the failure points of the software module, as illustrated in step 206 of FIG. 2. In particular embodiments, step 206 may be performed by component 104 of system 100 illustrated in FIG. 1, which may take as input the software module and its failure points, perform symbolic execution on the software module, and provide as output a set of expressions.

In the field of computer science, symbolic execution refers to the analysis of software modules or software programs by tracking symbolic rather than actual values, as a case of abstract interpretation. It is a non-explicit state model-checking technique that treats input to software modules as symbol variables. It creates complex mathematical equations or expressions by executing all finite paths in a software module with symbolic variables and then solves the complex equations with a solver (typically known as a decision procedure) to obtain error scenarios, if any. In contrast to explicit state model checking, symbolic execution is able to work out all possible input values and all possible use cases of all possible input values in the software module under analysis.

In particular embodiments, symbolic execution is performed on the software module to determine, for each of the failure points located in the software module, an expression that causes the function to reach that particular failure point. Thus, in particular embodiments, the number of expressions obtained from symbolically executing the software module equals the number of failure points in the source code of the software module. In particular embodiments, the software module may be symbolically executed while its input variable is given a symbolic value. For example, function "validateForm" may be symbolically executed while its input variable "formObj" is given a symbolic value. Since function "validateForm" includes three failure points, performing symbolic execution on function "validateForm" results in three expressions. First, expression "formObj.password.value.length==0" causes the function to reach the failure point at line 5. Second, expression "!(/^\w+([\.-]?\w+)*@\w+([\.-]?\w+)*(\.\w{2,3})+$/.test(formObj.email.value)" causes the function to reach the failure point at line 9. And third, expression "isNaN (formObj.phno.value)" causes the function to reach the failure point at line 14.

Particular embodiments may then combine all the individual expressions that cause the software module to reach each of its failure points together into a single set of expressions using logical "OR", also referred to as logical disjunction. This first set of expressions, thus, causes the software module to reach any of its failure points. For example, with function "validateForm", which has three failure points and three expressions obtained from symbolic execution that cause the function to reach the three failure points respectively, the combined set of expression is "(formObj.password.value.length==0)||(!(/^\w+([\.-]?\w+)*@\w+([\.-]?\w+)*(\.\w{2,3})+$/.test(formObj.email.value))||(isNaN (formObj.phno.value))".

Particular embodiments may negate the first set of expressions to obtain a second set of expressions (e.g., by applying a logical "NOT" on the first set of expressions), as illustrated in step 208 of FIG. 2. Since the first set of expressions obtained in step 206 of FIG. 2 causes the software module to reach all of its failure points, negating this first set of expressions results in the second set of expressions that causes the software module to reach none of its failure points. In other words, if the second set of expressions is satisfied, the software module may be executed completely and successfully. This second set of expressions is in fact all the constraints the software module places on its input variable in order for the software module to be executed completely and successfully. Since the software module, in this case, is an event handler or a callback function associated with a user-interface component through which users may provide actual input values for a user input of the software application, the constraints the software module places on its input variable are the constraints the software module places on the values for the user input provided through the user-interface component. For example, with function "validateForm", negating the above set of expressions results in another set of expressions as "(formObj.password.value.length !=0)&&(/^ \w+([\.-]?\w+)*@\w+([\.-]?\w+)*(\.\w{2,3})+$/.test(formObj.email.value) && !i sNaN (formObj.phno.value)". This second set of expressions represents the constraints placed on the values that may be entered by the users through the HTML "<form>" element with which function "validateForm" is associated.

Particular embodiments may solve the second set of expressions, which represents the constraints placed on the values of a user input, to obtain one or more values that satisfy all the constraints, as illustrated in step 210 of FIG. 2. In particular embodiments, step 210 may also be performed by component 106 of system 100 illustrated in FIG. 1, which takes as input a set of expressions and provides as output one or more values that satisfy the set of expressions. In particular embodiments, component 106 may be a constraint solver implemented based on the Satisfiability Modulo Theories (SMT). Component 106 may determine if there is any value that satisfies all the constraints represented by the set of expressions and if so, what they are by finding one or more solutions for the set of expressions.

In the case of the software module that handles a user input, the set of expressions obtained from step 208 of FIG. 2 causes the software module to be executed completely and successfully. That is, none of the failure points of the software module is reached if the set of expressions is satisfied. Suppose that one or more values exist that satisfy the set of expressions. This means that if such a value is applied to the input variable of the software module, the software module may be executed completely and successfully. One way to cause such a value to be applied to the input variable of the software module, when the software application is being executed, is to enter the value in the user-interface component with which the software module is associated.

In particular embodiments, steps 204, 206, 208, 210 may be performed with respect to each software module that handles a particular user input to the software application. As a result, a set of expressions representing the constraints placed on each user input may be determined, and one or more actual input values may be determined for each user input that satisfy all the constraints placed on that user input (e.g., by solving the set of expressions representing the constraints placed on the user input). In particular embodiments, these actual input values may then be used in connection with testing and validating the software modules by, for example, applying them to the corresponding software modules as test input values. With the above example where a text-input field contained in a web page may be used to enter a VISA credit card number, from the software module that handles this text-input field, it may be determined that the constraints placed on the input values to this text-input field are: (1) the input value must consist of numeric digits only; (2) the input value must have 16 numeric digits; and (3) the input value must start with the digit "4". The three constraints may together be represented as a set of expressions obtained by performing, for example, steps 204, 206, and 208 of FIG. 2 with respect to the software module that handles the text-input field. Solving the set of expressions may result in one or more 16-digit numeric values that satisfy all three constraints. Thereafter, the software module that handles the text-input field may be tested by entering the 16-digit numeric values in the text-input field one at a time. Since each of the 16-digit numeric values satisfies all the constraints placed on this user input, testing the software module with such a 16-digit numeric value causes the software module to be executed completely and successfully, which means that the software module may be tested completely by executing its code all the way to the end where the software module returns "true".

Figure 5:
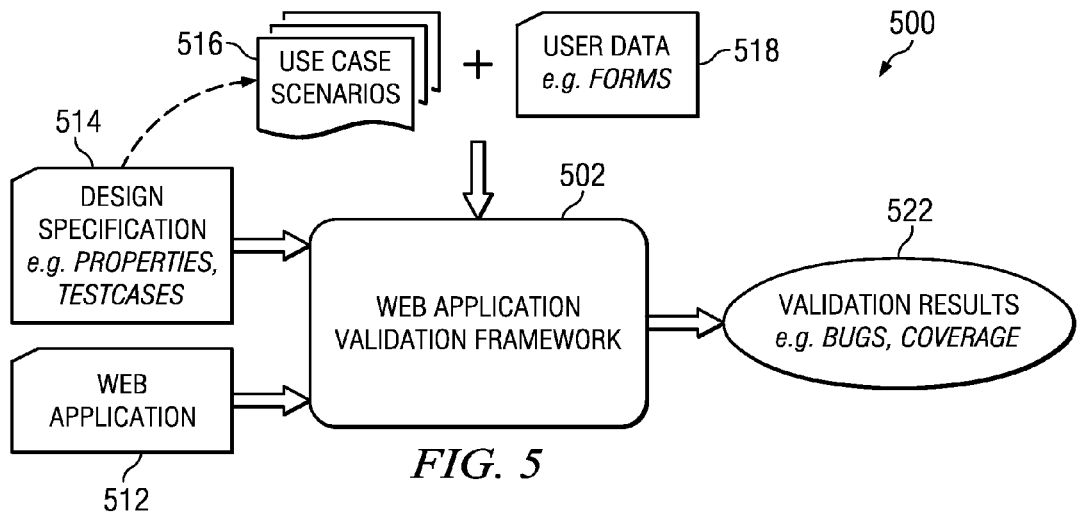
FIG. 5 illustrates an example system for testing and validating a web application.

In particular embodiments, the process illustrated in FIG. 2 may be used to automatically generate test user-input data for testing and validating a web application. FIG. 5 illustrates a system 500 that provides a testing environment for automatically testing and validating a web application. In particular embodiments, system 500 includes a web application validation framework 502. In particular embodiments, web application validation framework 502 may include any number of functional modules and may be implemented as hardware, software, or a combination thereof. In particular embodiments, web application validation framework 502 may take as input a web application 512, which is the web application to be tested and validated, the design specification 514 of web application 512, and the use case scenarios 516 and the test user-input data 518 to be applied to web application 512 for testing and validation purposes. In particular embodiments, web application validation framework 502 may perform applicable tests on web application 512 based on use case scenarios 516 and test user-input data 518, and provide as output the results 522 of the test. For example, web application validation framework 502 may provide a report indicating which portions of the code of web application 512 have been tested and validated (e.g., the test coverage), and whether any errors have been found and if so, what they are.

In particular embodiments, use case scenarios 516 may be determined based on design specification 514 of web application 512. For example, each use case scenario 516 may specify a sequence of user actions performed in connection with web application 512 (e.g., user actions that interact with web application 512 or provide input to web application 512). In particular embodiments, test user-input data 518 may be automatically generated for web application 512 using, for example, the process illustrated in FIG. 2. When testing web application 512, in particular embodiments, web application validation framework 502 may apply specific use case scenarios 516 to web application 512 in connection with specific test user-input data 518.

Figure 6:
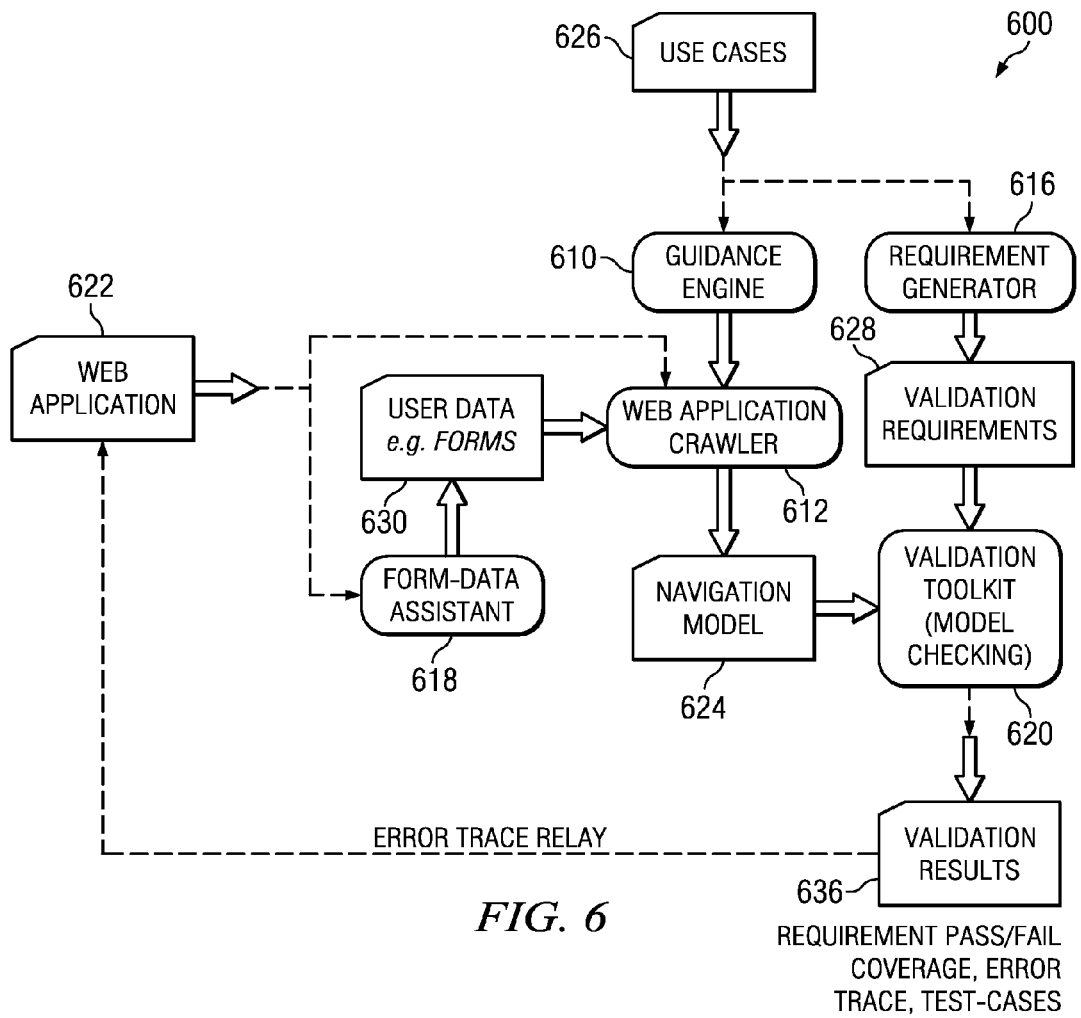
FIG. 6 illustrates an example application context for the process illustrated in FIG. 2.

The process illustrated in FIG. 2 may have many practical applications and generating test user-input data for testing and validating a web application is just one of them. FIG. 6 illustrates another application context 600 for the process illustrated in FIG. 2. In particular embodiments, system 600 may include a guidance engine 610, a web crawler 612, a requirement generator 616, a form-data assistant 618, and a validation toolkit 620. The components of system 600 may each be implemented as hardware, software, or a combination thereof. In particular embodiments, the process illustrated in FIG. 2 may a part of form-data assistant 618, which automatically generates user-input data 630 for a web application 622.

In particular embodiments, with the aid of guidance engine 610, web application crawler 612 may access and crawl web application 622 and output a navigation model 624 for web application 622. In particular embodiments, requirement generator 616 may generate implementation-level validation requirements 628 based at least in part on user-level validation requirements 626 (e.g., use cases). In particular embodiments, validation requirements 628 may be applied as input to validation toolkit 620, and validation toolkit 620 may validate web application 622 using navigation model 624 in conjunction with validation requirements 628 and output validation results 634.

Figure 3:
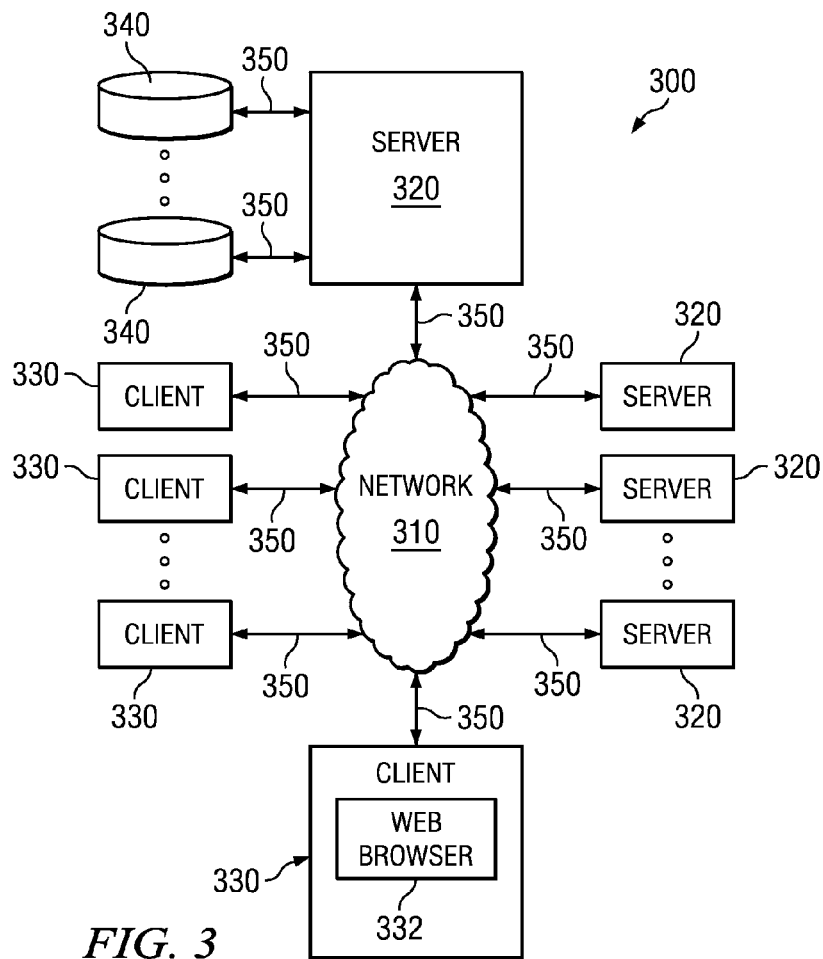
FIG. 3 illustrates an example network environment.

Particular embodiments may be implemented in a network environment. FIG. 3 illustrates an example network environment 300 suitable for providing software validation as a service. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a portion of the Internet, or another network 310 or a combination of two or more such networks 310. The present disclosure contemplates any suitable network 310.

One or more links 350 couple a server 320 or a client 330 to network 310. In particular embodiments, one or more links 350 each includes one or more wireline, wireless, or optical links 350. In particular embodiments, one or more links 350 each includes an intranet, an extranet, a VPN, a LAN, a WLAN, a WAN, a MAN, a portion of the Internet, or another link 350 or a combination of two or more such links 350. The present disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores.

In particular embodiments, one or more data storages 340 may be communicatively linked to one or more severs 320 via one or more links 350. In particular embodiments, data storages 340 may be used to store various types of information. In particular embodiments, the information stored in data storages 340 may be organized according to specific data structures. In particular embodiment, each data storage 340 may be a relational database. Particular embodiments may provide interfaces that enable servers 320 or clients 330 to manage, e.g., retrieve, modify, add, or delete, the information stored in data storage 340.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. The present disclosure contemplates any suitable clients 330. A client 330 may enable a network user at client 330 to access network 330. A client 330 may enable its user to communicate with other users at other clients 330.

A client 330 may have a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 330 may enter a Uniform Resource Locator (URL) or other address directing the web browser 332 to a server 320, and the web browser 332 may generate a Hyper Text Transfer Protocol (HTTP) request and communicate the HTTP request to server 320. Server 320 may accept the HTTP request and communicate to client 330 one or more Hyper Text Markup Language (HTML) files responsive to the HTTP request. Client 330 may render a web page based on the HTML files from server 320 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 4:
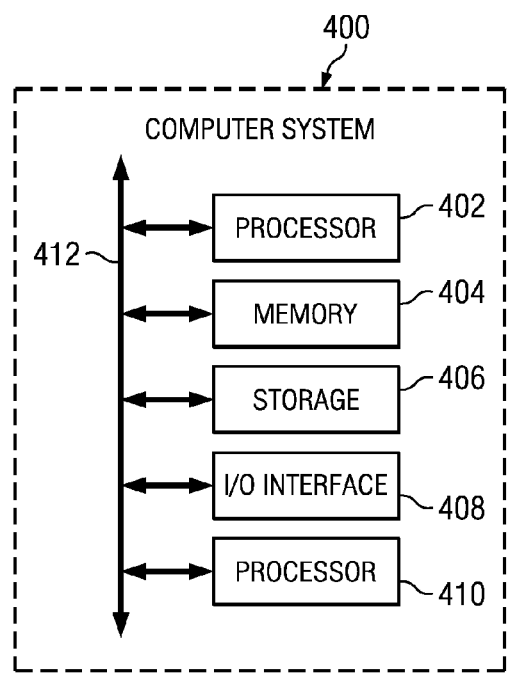
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computing devices:
    analyzing client-tier source code of a client-server software application to extract one or more software modules that handle user-input data of the software application;
    for each one of the software modules, extracting from the software module one or more user-input constraints placed on the user-input data, comprising:
        analyzing source code of the software module to determine one or more failure points in the source code;
        performing symbolic execution on the software module to extract one or more first expressions that cause the software module to reach the failure points, respectively;
        obtaining a second expression as the disjunction of all the first expressions;
        obtaining a third expression as the negation of the second expression; and
        extracting the user-input constraints from the third expression; and
    determining one or more user-input data that satisfy all the user-input constraints.

2. The method of claim 1, wherein:
    the client-server software application is a web application;
    the client-tier source code is written in HTML and JavaScript; and
    analyzing the client-tier source code to extract the software modules that handle the user-input data of the software application comprises:
        parsing the HTML source code to locate one or more "<form>" elements and one or more "onsubmit ( )" handler functions associated with the "<form>" elements; and
        parsing the JavaScript source code to extract the "onsubmit ( )" handler functions associated with the "<form>" elements as the software modules that handle the user-input data of the software application.

3. The method of claim 2, wherein for each one of the software modules, analyzing the source code of the software module to determine the failure points in the source code comprises, for each one of the "onsubmit ( )" handler functions associated with the "<form>" elements, parsing the JavaScript source code of the "onsubmit ( )" handler function to locate one or more "return false" code as the failure points in the JavaScript source code.

4. The method of claim 1, wherein determining the user-input data that satisfy all the user-input constraints comprises solving the user-input constraints using a satisfiability-modulo-theories solver to obtain the user-input data.

5. The method of claim 1, further comprising testing the software application using the user-input data.

6. A system comprising:
    a memory comprising instructions executable by one or more processors; and
    one or more processors coupled to the memory and operable to execute the instructions, the one or more processors being operable when executing the instructions to:

analyze client-tier source code of a client-server software application to extract one or more software modules that handle user-input data of the software application;

for each one of the software modules, extract from the software module one or more user-input constraints placed on the user-input data, comprising:

analyze source code of the software module to determine one or more failure points in the source code;

perform symbolic execution on the software module to extract one or more first expressions that cause the software module to reach the failure points, respectively;

obtain a second expression as the disjunction of all the first expressions;

obtain a third expression as the negation of the second expression; and extract the user-input constraints from the third expression; and determine one or more user-input data that satisfy all the user-input constraints.

7. The system of claim 6, wherein:

the client-server software application is a web application;

the client-tier source code is written in HTML and JavaScript; and analyze the client-tier source code to extract the software modules that handle the user-input data of the software application comprises:

parse the HTML source code to locate one or more "<form>" elements and one or more "onsubmit ( )" handler functions associated with the "<form>" elements; and parse the JavaScript source code to extract the "onsubmit ( )" handler functions associated with the "<form>" elements as the software modules that handle the user-input data of the software application.

8. The system of claim 7, wherein for each one of the software modules, analyze the source code of the software module to determine the failure points in the source code comprises, for each one of the "onsubmit ( )" handler functions associated with the "<form>" elements, parse the JavaScript source code of the "onsubmit ( ) " handler function to locate one or more "return false" code as the failure points in the JavaScript source code.

9. The system of claim 6, wherein determine the user-input data that satisfy all the user-input constraints comprises solve the user-input constraints using a satisfiability-modulo-theories solver to obtain the user-input data.

10. The system of claim 6, wherein the processors are further operable when executing the instructions to test the software application using the user-input data.

11. One or more computer-readable non-transitory storage media embodying software operable when executed by one or more computing devices to:

analyze client-tier source code of a client-server software application to extract one or more software modules that handle user-input data of the software application;

for each one of the software modules, extract from the software module one or more user-input constraints placed on the user-input data, comprising:

analyze source code of the software module to determine one or more failure points in the source code;

perform symbolic execution on the software module to extract one or more first expressions that cause the software module to reach the failure points, respectively;

obtain a second expression as the disjunction of all the first expressions;

obtain a third expression as the negation of the second expression; and extract the user-input constraints from the third expression; and determine one or more user-input data that satisfy all the user-input constraints.

12. The media of claim 11, wherein:

the client-server software application is a web application;

the client-tier source code is written in HTML and JavaScript; and analyze the client-tier source code to extract the software modules that handle the user-input data of the software application comprises:

parse the HTML source code to locate one or more "<form>" elements and one or more "onsubmit ( )" handler functions associated with the "<form>" elements; and parse the JavaScript source code to extract the "onsubmit ( )" handler functions associated with the "<form>" elements as the software modules that handle the user-input data of the software application.

13. The media of claim 12, wherein for each one of the software modules, analyze the source code of the software module to determine the failure points in the source code comprises, for each one of the "onsubmit ( ) " handler functions associated with the "<form>" elements, parse the JavaScript source code of the "onsubmit ( )" handler function to locate one or more "return false" code as the failure points in the JavaScript source code.

14. The media of claim 11, wherein determine the user-input data that satisfy all the user-input constraints comprises solve the user-input constraints using a satisfiability-modulo-theories solver to obtain the user-input data.

15. The media of claim 11, wherein the software is further operable when executed by the computing devices to test the software application using the user-input data.

* * * * *